United States Patent [19]

Conner

[11] Patent Number: 5,137,656
[45] Date of Patent: Aug. 11, 1992

[54] WATER RESISTANT MINERAL PRODUCTS

[75] Inventor: Herbert T. Conner, Landenburg, Pa.

[73] Assignee: Hercules Incorporated, Wilmington, Del.

[21] Appl. No.: 290,592

[22] Filed: Dec. 27, 1988

Related U.S. Application Data

[63] Continuation-in-part of Ser. No. 87,833, Aug. 21, 1987, abandoned.

[51] Int. Cl.$^5$ .................. C04B 35/80; D21F 11/00; D21H 13/44
[52] U.S. Cl. .................. 252/378 R; 162/152; 162/155; 162/181.6
[58] Field of Search .......... 232/378 R, 378 P; 162/164.6, 181.6, 152, 155

[56] References Cited

U.S. PATENT DOCUMENTS

| H,254 | 7/1987 | Hindman | 252/378 |
|---|---|---|---|
| 1,972,390 | 9/1934 | Miner | 91/70 |
| 2,625,512 | 1/1953 | Powell | 252/62 |
| 2,626,872 | 1/1953 | Miscall | 106/122 |
| 2,634,208 | 4/1953 | Miscall et al. | 106/122 |
| 2,901,390 | 8/1959 | Conrlin | 162/155 |
| 3,005,745 | 10/1961 | Holmes | 162/155 |
| 3,008,867 | 11/1961 | Holmes | 162/155 |
| 3,014,835 | 12/1961 | Feigley | 162/155 |
| 3,356,611 | 12/1967 | Walker et al. | 252/28 |
| 3,524,796 | 8/1970 | Yui | 162/175 |
| 3,654,073 | 4/1972 | Lard et al. | 162/155 |
| 4,029,544 | 6/1977 | Jarowenko | 162/175 |
| 4,271,228 | 6/1981 | Foster et al. | 428/281 |
| 4,296,012 | 10/1981 | Okumichi et al. | 162/164.1 |
| 4,313,997 | 2/1982 | Ruff et al. | 428/220 |
| 4,486,235 | 12/1984 | Kamigaito et al. | 106/287 |
| 4,520,073 | 5/1985 | Randolph et al. | 428/405 |
| 4,543,287 | 9/1985 | Briggs | 162/169 |
| 4,614,546 | 9/1986 | Schoer et al. | 162/164.4 |
| 4,629,655 | 12/1986 | Winters | 162/158 |
| 4,678,700 | 7/1987 | McAloon et al. | 428/198 |
| 4,777,206 | 10/1988 | Ritter | 162/152 |
| 4,861,376 | 8/1989 | Edwards | 162/158 |
| 4,919,724 | 4/1990 | Canisio et al. | 524/300 |
| 5,013,775 | 5/1991 | Oikawa et al. | 524/365 |

FOREIGN PATENT DOCUMENTS 60-200848  3/1984  Japan.

*Primary Examiner*—Gary P. Straub
*Attorney, Agent, or Firm*—Joanne W. Patterson; Marion C. Staves

[57] ABSTRACT

An aqueous dispersion of vermiculite lamellae is provided having incorporated therein from about 0.2 to about 10% by weight of at least one internal sizing agent based on the dry weight of the vermiculite in the dispersion.

7 Claims, 1 Drawing Sheet

Contact angle relationship to sizing response in alkylketene dimer sized vermiculite sheets.

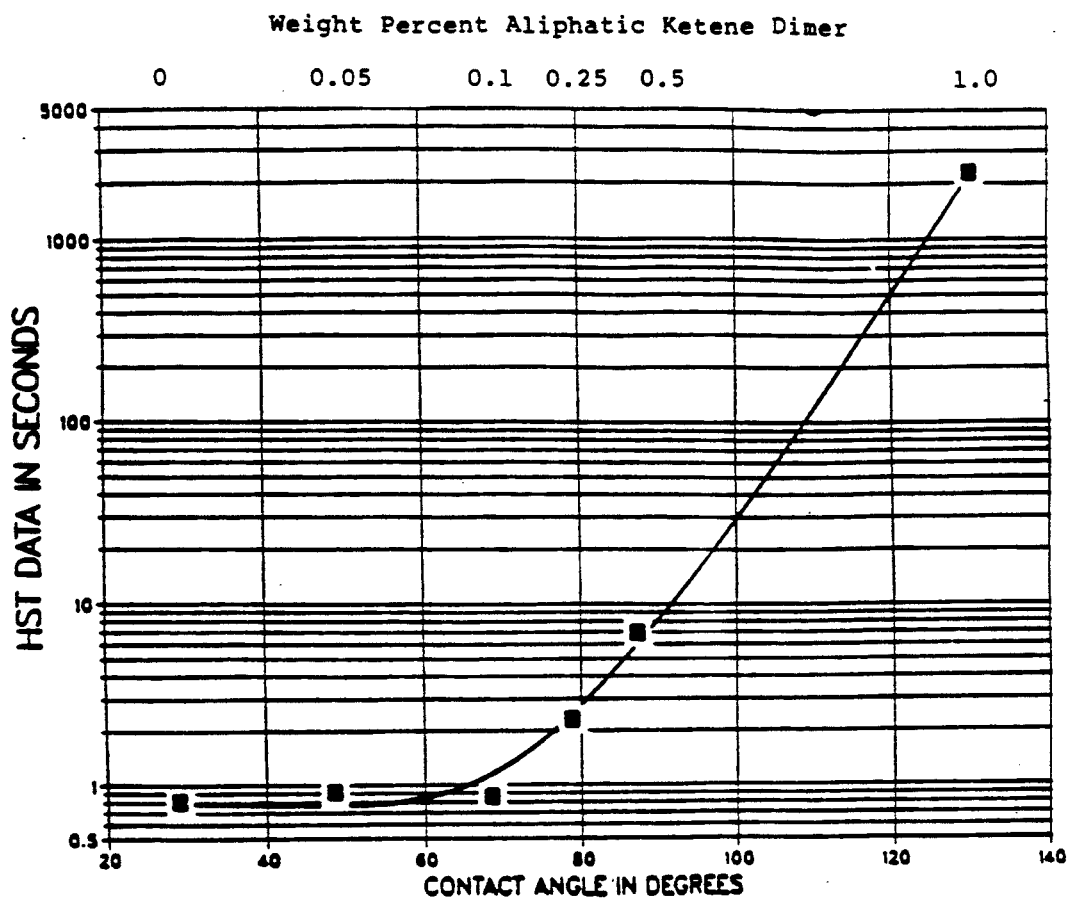
Contact angle relationship to sizing response in alkylketene dimer sized vermiculite sheets.

WATER RESISTANT MINERAL PRODUCTS

This application is a continuation-in-part of U.S. application Ser. No. 07/087,833, which was filed Aug. 21, 1987 now abandoned.

FIELD OF THE INVENTION

This invention concerns products comprising vermiculite having improved resistance to water penetration, wetting and absorption.

BACKGROUND OF THE INVENTION

It is known that vermiculite ore, a type of layer mineral (and other layer-silicate minerals containing vermiculite layers, e.g., hydrobiotite or chlorite vermiculite) can be delaminated by first exfoliating the mineral by application of heat to expand the vermiculite particle structure, or by chemical means such as treatment with hydrogen peroxide or with aqueous solutions of salts followed by washing and soaking in water to swell the vermiculite particulate structure. Such treatment is then followed by mechanically shearing the resulting expanded or swollen granules of vermiculite in water to form an aqueous dispersion of tiny particles or platelets of vermiculite known as vermiculite lamellae. Such processes for the delamination of vermiculite ore are described, for example, in U.S. Pat. Nos. 4,608,303; 4,472,478; 4,271,228; 3,791,969; 3,434,917; 3,325,340 and GB Nos. 2,007,153; 1,585,104; 1,119,305; and 1,076,786.

It is also known that aqueous dispersions of vermiculite lamellae obtained by the delamination of vermiculite ore as described above can be used to fabricate shaped articles or products such as paper, sheets or composites with other fibrous material by casting the dispersion against surfaces of various shapes and sizes and removing water from the vermiculite particles. Such dispersions can also be used to form rigid foams by gasifying the dispersion prior to removal of water from it. Examples of such product fabrication are also provided in the aforementioned references.

Recently it has been reported that vermiculite ore can be mechanically delaminated merely by subjecting an aqueous slurry of the ore to a shearing action, such as, for example, shearing by a rotary paddle, cowles blade, colloid mill, roller mill or some similar shearing macerator, until a dispersion containing vermiculite lamellae having dimensions less than 200 microns is produced. Such a process is described in U.S. Pat. No. 4,801,403.

Articles composed wholly of vermiculite ore particles or composites comprising vermiculite ore particles possess a degree of structural integrity which may be due to the great extent of overlapping of the individual vermiculite platelets or lamellae to form layers, and the strong adhesive forces generated by the high surface charge density characteristic of the vermiculite layers. Further, due to their high heat resistance, such articles comprising vermiculite are particularly suited for use, for example, as electrical and thermal insulation materials, fireproof packaging materials and refractory-facing materials.

Despite such usefulness, however, the employment of such articles has been limited in applications where there is contact with aqueous media, as such vermiculite articles tend to absorb and hold water which not only detracts from their electrical insulating qualities, but tends to weaken them physically therein imperiling structural integrity and as such may actually disintegrate during prolonged exposure.

Various methods have been proposed to impart resistance to water dispersibility in vermiculite products wherein structural integrity of the vermiculite lamellae framework is maintained in aqueous media over long periods of time. Such methods typically propose the addition of "wet-strength" improvers to dispersions of vermiculite lamellae or the incorporation of such wet-strength improvers into articles formed therefrom. These methods include, for example, post-formation treatment of vermiculite articles with aqueous solutions of electrolytes, U.K. Specification No. 1,016,385; B.P. No. 1,593,382; U.S. Pat. No. 4,608,303; and the post-formation treatment of such articles with ammonia vapor or the vapor of an amine, U.S. Pat. No. 4,219,609. Other methods include treatment of dispersions of vermiculite lamellae used to form products with solutions of inorganic ions, U.S. Pat. Nos. 4,269,628 and 4,497,869; the incorporation of a source of ammonia or ammonium ions, preferably urea, into a dispersion of vermiculite lamellae, U.S. Pat. No. 4,539,046; and the incorporation of a urea-formaldehyde or melamine-formaldehyde resin into a dispersion of vermiculite lamellae, U.S. Pat. No. 4,485,203.

Such methods, however, merely help to maintain the structural integrity of articles composed of vermiculite in aqueous media, but do not decrease or halt surface wetting of such articles. Such surface wetting leads to penetration and absorption of water therein, which limits the use of such articles as electrical insulators in applications where contact with aqueous media is a possibility. Indeed, several of the aforementioned methods actually increase water absorption by rendering the surface of vermiculite containing articles hydrophilic in nature thus increasing surface wetting. Moreover, those methods mentioned above which employ ionexchange processes as a wet-strength improver may be disadvantageous from the standpoint that such improvement in wet-strength may decrease or become non-existent when vermiculite articles treated with such ions are exposed to media containing exchangeable competing ions. Further, those processes mentioned above which employ post-article formation treatment methods are additionally non-desirable from the standpoint of the need to avoid extra processing steps, followed by thorough rewetting and washing to remove excess salts, ammonia and the like, therein followed by thorough redrying. Those disadvantages are further compounded in the manufacture of vermiculite foams due to the thickness and absorbent nature of the foam.

Accordingly, it is an object of this invention to provide a process for the production of shaped vermiculite articles having improved resistance to surface wetting in aqueous media with correspondingly decreased water penetration and absorption. It is still a further object of this invention to provide a method for producing said formed vermiculite articles from dispersions of vermiculite lamellae.

SUMMARY OF THE INVENTION

It has now been found, heretofore unknown in the prior art, that shaped vermiculite articles containing more than about 80% by weight of vermiculite having improved resistance to surface wetting in aqueous-based media with correspondingly decreased water penetration and absorption can be produced from a dispersion of vermiculite lamellae. In accordance with this invention, a process is claimed comprising the steps of (1) incorporating into an aqueous dispersion of vermiculite lamellae from about 0.2 to about 10%, most preferably from about 0.5 to about 5% by weight of the dry vermiculite of at least one internal sizing agent capable of developing a contact angle formed between the surface of the article produced from the aqueous dispersion and an impinging aqueous-based liquid that is greater than about 80°, then (2) forming shaped articles from the dispersion produced in step (1) by depositing vermiculite lamellae on a surface and removing water therefrom. The term "aqueous-based liquid" when used in this application shall be understood to mean water and solutions containing more than 50% by weight of water. In addition to water itself, examples of typical aqueousbased liquids are inks, latexes, salt solutions, acids, bases, etc.

DETAILED DESCRIPTION OF THE INVENTION

The term "vermiculite" used herein refers to all materials known mineralogically or commercially as vermiculite, and minerals consisting wholly or largely of vermiculite including minerals of a mixed-layer type (phyllosilicates) containing vermiculite layers as a constituent such as hydrobiotites and chlorite-vermiculites, and which can be delaminated in the same or similar manner as vermiculite. While vermiculite is the preferred layer mineral, other layer minerals may be used including montmorillonite, kaolinite and clays comprising sepiolite, kaolinite, and other layer silicate minerals which can be delaminated to produce lamellae or plate-like particles.

Vermiculite lamellae or platelets can be characterized as having a particle size typically less than about 200 microns, preferably less than about 50 microns, and having one dimension that is small compared to the other two dimensions with an aspect ratio (i.e., length or breadth divided by thickness) of at least 10.

Vermiculite lamellae and dispersions thereof useful in this invention may be formed by any suitable method known in the art. For example, vermiculite ore can be heated to temperatures in excess of 1000° F. to exfoliate or expand vermiculite ore particles followed by dispersing the particles in water and then mechanically shearing said particles to the desired size. Such a process is described, for example, in U.S. Pat. Nos. 4,486,235 and 4,271,228.

Suitable dispersions may also be formed by mechanically delaminating vermiculite ore merely by subjecting an aqueous slurry of the ore to a shearing action, such as, for example, shearing by a rotary paddle, cowles blade, colloid mill, roller mill or some similar shearing macerator, until a dispersion containing vermiculite lamellae having suitable dimensions is produced. Such a process is described in U.S. Pat. No. 4,801,403.

Furthermore, vermiculite ore can be contacted with a solution of hydrogen peroxide which swells the vermiculite ore particles therein followed by mechanically shearing the swollen particles to platelets or lamellae of a desired size. Such a process is also described, for example, in U.S. Pat. No. 4,486,235.

It is also known that aqueous suspensions of swollen vermiculite ore particles can be prepared by substituting monovalent inorganic cations or organocations for exchangeable cations retained by the ore followed by a subsequent step of aqueous washing to remove excess salt and effect macroscopic ore particle swelling. The swollen ore particles are then mechanically sheared in water to delaminate the vermiculite structure therein producing an aqueous dispersion of vermiculite lamellae. Such a process is described, for example, in U.S. Pat. Nos. 3,325,340; 4,608,303 and U.K. Specification No. 1,593,382.

In accordance with this invention, shaped vermiculite articles having improved resistance to surface wetting in aqueous-based media with correspondingly decreased water penetration and absorption can be produced from dispersions of the aforesaid vermiculite lamellae having incorporated therein an internal sizing agent in sufficient amount. Said sizing agent is adsorbed or absorbed by the tiny particles of vermiculite lamellae therein coating the particles either upon the entire surface or on one or more spots of the respective particles. The coatings on the vermiculite particles are stable and adherent to the particles and remain on the particles in the aqueous dispersion thereof, and during the formation of shaped products from the vermiculite lamellae to produce shaped articles which are resistant to aqueous-based liquid absorption and penetration. Thus, the finished shaped articles comprise more than about 80% by weight of vermiculite lamellae which carry adsorbed or absorbed internal sizing material in amounts from about 0.2 to about 10%, most preferably from about 0.5 to about 50% by weight.

Sizing is a process most readily identified with the paper manufacturing industry wherein chemical additives are employed to provide paper and paper products, e.g., paperboard, with resistance to wetting, penetration and absorption by aqueous-based liquids such as ink and milk. Thus, a general purpose of sizing agents utilized in this invention is to impart a desired degree of water repellency with attendant resistance to wetting, penetration and absorption of aqueous-based liquids to the surface of shaped vermiculite articles.

When an aqueous-based liquid contacts the surface of a vermiculite sheet or other shaped vermiculite article, it must first "wet" the surface of the article, after which it tends to spread out laterally along the surface. Lateral surface movement in this manner can be accelerated by capillary action induced by closely parallel deposited vermiculite particles or platelets lying in this surface. Liquid can also move transversely by penetrating through the vermiculite product wherein it is drawn into the vermiculite sheet structure by capillary action of pores or spaces between the vermiculite platelets. Further, the liquid can penetrate into the vermiculite product and spread along its surface by paths through the deposited vermiculite platelet material itself. All of the aforementioned liquid movement phenomena can lead to aqueous-based liquid absorption by the shaped vermiculite article.

A phenomena demonstrating the extent to which any of the aforementioned liquid movement can occur is the contact angle formed between an impinging aqueous-based liquid and the mineral surface of the vermiculite article. For example, an initial contact angle of from about 90 to about 170% is indicative of a well-sized, and correspondingly, water-repellent article. Such a well-sized article permits only limited wetting and spreading of the aqueous-based liquid wherein said liquid has no tendency to penetrate through pores or engage in other liquid movement as discussed above. However, if the contact angle is much less than about 90°, for example, 80° or less, extensive wetting and spreading may result therein increasing the tendency to penetrate and be absorbed by the vermiculite mineral surface.

Demonstrating the effectiveness of an internal sizing agent in accordance with this invention is, therefore, its ability to provide the vermiculite article with a relatively low surface energy hydrophobic coating such that an impinging high energy aqueous-based liquid will form a high contact angle with the surface and thus be discouraged from moving extensively on the sized vermiculite surface. It has unexpectedly been found that internal sizing agents commonly used in making paper satisfy these requirements and thus are useful in this invention. Examples of such internal sizing agents are the aliphatic ketene dimers, alkenyl succinic anhydrides, rosin-based size emulsions and dispersions, paraffin and microcrystalline wax emulsions. The most preferred internal sizing agents are the aliphatic ketene dimers, alkenyl succinic anhydrides, and rosin-based size emulsions and dispersions.

Specific examples of rosin-based sizing compounds useful in accordance with this invention include alkali metal salts of gum, wood or tall oil rosin (saponified rosin size) or modified rosins (fortified rosin size), such as maleic anhydride or fumaric acid-modified rosins, commercially available, for example, from Hercules Incorporated under its Pexol ® line of products, and high free-rosin size emulsions (dispersed rosin size) available, for example, from Hercules Incorporated under its Neuphor ® line.

The major constituent of rosin-based sizing compounds, which are amphiphatic materials, is a group of polycyclic organic acids (approximately 90%), called resin acids, and which contain bulky, hydrophobic organic mass and carboxyl groups which can serve at least two functions in sizing of vermiculite mineral surfaces in accordance with this invention. First, the carboxyl groups can form a salt with an alkali metal to convert the rosin to a water dispersible form, which can then be converted to an aluminum salt on reaction with a soluble aluminum salt, for example, aluminum sulfate or "alum", to form a positively charged aluminum resinate in the form of a cationic colloidal particle. The colloidal particle can then be attracted and absorbed or adsorbed and retained on the negatively charged vermiculite mineral surface which typically contains a multiplicity of hydroxyl groups. Thus, an insoluble cationic aluminum resinate precipitate can form that in turn can be retained on the anionic vermiculite mineral surface by electrostatic forces, and which can then reorient on the vermiculite surface during drying to provide a low energy hydrophobically modified vermiculite mineral surface. In certain cases it may be desirable to produce aluminum resinates by reacting rosin-based compounds with alum, but it should be understood that rosin-based compounds can be used without reacting with alum.

In accordance with this invention, alum can react with water to produce a mixture of aluminum ions and aluminum hydrates which, in turn, can then react with rosin-based compounds as described above to produce the aluminum resinates useful as internal sizing compounds in this invention.

In dilute emulsion form, rosin-based sizing compounds useful in this invention consist of a mixture of alkali metal resinate molecules, such as sodium resinate, and emulsified rosin particles which can react with alum to produce a positively charged rosin-alum precipitate, which in turn can then be attracted to the negatively charged vermiculite mineral surface by electrostatic forces. Upon heating and/or drying the rosin-alum precipitate can reorientate to produce a water-repellant surface.

In accordance with this invention a dilute emulsion of saponified, fortified, or dispersed rosin-based size is added to a dispersion of vermiculite lamellae. The dilute size may be added batch wise or continuously over a period of time. The soluble aluminum salt, preferably alum, is usually added after the size to a final pH of about 3 to about 8. Depending upon the conditions, however, such as water hardness, alkalinity or the presence of interfering ions, it may be beneficial to first add the alum to the dispersion of vermiculite lamellae before addition of the rosin size to ensure that said rosin size reacts with the aluminum salt to form the aluminum-resinate precipitate rather than reacting with other interfering ions. The order of addition, however, is not critical to this invention.

When dispersions of vermiculite lamellae, in accordance with this invention, are employed in papermaking it may be desirable to first add the rosin-based sizing compound to a flocculated pulp slurry comprising vermiculite lamellae followed by the addition of alum. In any event, the rosin-based size and alum should be added sufficiently early to provide uniform distribution in the vermiculite lamellae dispersion and adequate time for the cationic aluminum resinate precipitate to form and be retained by the anionic vermiculite mineral surface. As indicated it may be desirable in certain cases to use the rosin-based sizing compound alone.

Further, in accordance with this invention such rosin-based sizing compounds as described above are useful in amounts ranging from about 0.2 to about 10%, most preferably from about 0.5 to about 5% by weight, based on the dry weight of the vermiculite in the dispersion. Such dispersions of vermiculite lamellae comprise from about 0.1 to about 50% by weight dry vermiculite in the dispersion. The amount of rosin-based sizing compound employed will vary depending upon such variables as the degree of water-repellency and non-wetting (size of contact angle formed) of the resulting vermiculite mineral surface desired and the pH of the dispersion.

Moreover, in accordance with this invention, any soluble aluminum salt is useful herein, for example, such as aluminum sulfate, aluminum chloride and sodium aluminate, although commercially available aluminum sulfate known as "alum", is preferred in this invention. Such compounds are useful in amounts ranging from about 0.2 to about 10% by weight, preferably from about 0.5 to about 2% by weight, based on the dry weight of vermiculite.

Paraffin and microcrystalline wax emulsions, which are highly hydrophobic in nature, can be added, in accordance with this invention, to dispersions of vermiculite lamellae batch-wise or continuously over a period of time. Such emulsions are cationic in nature and can be retained on the vermiculite mineral surface by electrostatic attraction or by the use of cationic alumina polymer or by the use of synthetic retention aids such as polyacrylamide-based material available from Hercules Incorporated under its Reten ® product line. Further, such wax-based sizing agents, which can be incorporated in dispersions of vermiculite lamellae as internal sizing agents in accordance with this invention, can be used alone or in combination with rosin-based sizing compounds or alumina-resinates such as described above. When such wax-based sizing compounds are used in conjunction with rosin size and a soluble aluminum salt as described above, the rosin size can react with the aluminum compound in a similar fashion as when used alone to form an alumina-resinate, which in turn can act as a wax-based size retention aid.

A specific example of a paraffin wax emulsion is, for example, an acid stable paraffin wax emulsion commercially available from Hercules Incorporated under its Paracol ® line of products.

Such wax-based sizing agents, in accordance with this invention, are useful in amounts ranging from about 0.2 to about 10% by weight, preferably from about 0.5 to about 5% by weight, based on the dry weight of vermiculite in the dispersion. Such dispersions of vermiculite lamellae comprise from about 0.1 to about 50% by weight dry vermiculite in the dispersion.

The aliphatic ketene dimers useful, in accordance with this invention as internal sizing agents, include those compounds selected from the class of aliphatic ketene dimers having the general formula,

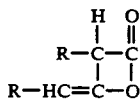

where at least one R in the formula represents a hydrophobic group containing more than 5 carbon atoms which may be selected from the group consisting of alkyl, alkenyl, aralkyl, or aralkenyl groups and the other R is hydrogen or an aliphatic hydrocarbon group. The alkenyl succinic anhydrides useful in this invention have the general formula,

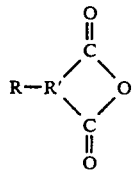

where R is a hydrophobic group containing more than 5 carbon atoms which may be selected from the group consisting of alkyl, alkenyl, aralkyl or aralkenyl groups and R' represents a dimethylene or trimethylene radical.

Specific examples of aliphatic ketene dimers useful in accordance with this invention include, for example, octyl, decyl, dodecyl, tetradecyl, hexadecyl, octadecyl, eicosyl, decosyl, and tetracosyl ketene dimers; ketene dimers prepared from palmitoleic acid, oleic acid, linoleic acid; and ketene dimers prepared from naturally occurring mixtures of fatty acids such as those mixtures in coconut oil, palm oil and the like, of which are described in U.S. Pat. No. 4,279,794, which is expressly incorporated by reference herein.

Specific examples of alkenyl succinic anhydrides useful in accordance with this invention include isooctadecenyl succinic acid anhydride, n-hexadecenyl succinic acid anhydride, dodecenyl succinic acid anhydride, decenyl succinic acid anhydride, and ectenyl succinic acid anhydride. These anhydrides are described in U.S. Pat. No. 3,821,069.

In accordance with this invention, the tiny particles of vermiculite lamellae can absorb or adsorb the ketene dimer or succinic anhydride described above such that said compounds form a low energy hydrophobic coating on the entire surface of each particle of vermiculite lamellae, or upon one or more spots of each said particle. In another aspect of this invention, each of the aforesaid types of reactive hydrophobic compounds can react with the vermiculite particle mineral surface, which typically contains a plurality of hydroxyl groups, to form covalent ester bonds, therein leaving their hydrophobic tails oriented outward from the vermiculite mineral surface to present a low energy hydrophobic surface to an impinging aqueous-based penetrant, thus exhibiting a high contact angle between the hydrophobically modified vermiculite surface and any impinging liquid.

Since the ketene dimer and succinic anhydride compounds are nonionic hydrophobic chemicals having little tendency to disperse in water on their own accord they can be emulsified by the use of any known dispersing agents and stabilizers, such as cationically modified starch available as Starlock 400 from A. E. Staley Manufacturing Company and Apollo 600 available from Penick & Ford, Ltd; sodium lignin sulfonate, or the reaction product of epichlorohydrin and an aminopolyamide such as Kymene ® 557, available from Hercules Incorporated. Such emulsions of reactive hydrophobic compounds are then added to dispersions of vermiculite lamellae in accordance with this invention.

The above-described ketene dimers and succinic anhydrides are useful in amounts in this invention ranging from about 0.2 to about 10% by weight, preferably from about 0.5 to about 5% by weight, based on the dry weight of vermiculite in the dispersion. Such dispersions of vermiculite lamellae comprise from about 0.1 to about 50% by weight dry vermiculite in the dispersion.

The resulting dispersions of vermiculite lamellae having incorporated therein one or more of the aforementioned compounds as an internal sizing agent, in accordance with this invention, can be used to manufacture any article comprising vermiculite as disclosed by the prior art, for example, paper and paper products, film, coatings and non-sheet solids which are resistant to aqueous-based liquid absorption and penetration.

As can be seen from those skilled in the art, this invention provides a novel process of manufacturing shaped articles from dispersions of vermiculite lamellae which have excellent resistance to aqueous-based liquid penetration and absorption. Such articles are useful as electrical insulating materials in addition to applications such as thermal insulation materials, materials for gasket fabrication, reactor facing materials and fireproof packaging materials.

The following examples more fully illustrate preferred embodiments of this invention wherein an aqueous dispersion of vermiculite lamellae having incorporated therein a sufficient amount of an internal sizing agent is employed to manufacture shaped articles which have excellent resistance to aqueous-based liquids absorption and penetration.

EXAMPLES I-VI

The following examples illustrate a preferred embodiment of this invention wherein various sizing agents useful in this invention are added to a composite slurry comprising 0.2 wt. % vermiculite lamellae of a size less than about 50 microns (based on dry vermiculite) and 0.03 wt. % Manville F110 glass fibers. After addition of said sizing agents in the indicated amounts, 1 wt. % Kymene ® 2064 is added to the resulting respective slurries followed by 0.5 wt. % Reten ® 523P (the percentage based on the dry weight of vermiculite), both commercially available flocculants available from Hercules Incorporated. Finished sheets are then fabricated from said slurries using a Noble and Wood handsheet machine followed by curing for 72 hours before testing. Respective sheets are then tested for contact angle formation using a Rame' Hart Incorporation NRL CA Goniometer Model #100-05 15, and for resistance to acid ink penetration using the Hercules Size Tester (HST) method which is described in Tappi Provisional Method T530 pm-75 (1975). The results are summarized below in Table I.

TABLE I

| Example No. | Internal Sizing Agent | Weight*** Percent | Average Contact Angle (degrees) | Average HST (seconds) |
|---|---|---|---|---|
| I | NONE | NONE | 55.7 | 0.57 |
| II* | Aliphatic Ketene Dimer | 1 | 134.5 | 2075.4 |
| III | Paracol Wax 404G | 2 | 120.8 | 10.1 |
| IV** | Alkenyl Succinic Anhydride | 2 | 127.2 | 3.8 |
| V | Pexol 550 | 2 | 120.7 | 3.4 |
| VI | Pexol 550 (+Alum %) | 2 | 127.5 | 3.1 |

*Aquapel ® 360XC available from Hercules Incorporated.
**Hy Size ® C available from Humphrey Chemical Co.
***Weight percent sizing agent based on dry vermiculite.

EXAMPLE VII

This example further illustrates an aspect of this invention wherein water repellency and decreased aqueous-based liquid penetration and absorption by a vermiculite mineral surface is due to increased contact angles formed between the surface of a shaped article formed from a dispersion of vermiculite lamellae, having incorporated therein an aliphatic ketene dimer as a sizing agent, and an impinging aqueous-based liquid.

A 0.2 wt. % (dry vermiculite) dispersion of vermiculite lamellae of a size less than about 50 microns was slurried in the absence and presence of various wt. % emulsions of aliphatic ketene dimer, specifically Aquapel ® 360XC available from Hercules Incorporated. Finished vermiculite sheets are then fabricated from the respective slurries using the Hercules Handsheet Operating Procedure Her 22305 5/74 method, followed by curing for 100 hours before testing. The respective sheets are then tested for contact angle formation and for resistance to ink penetration, and the results summarized in FIG. 1 of the drawings.

I claim:

1. An aqueous dispersion of vermiculite lamellae having incorporated therein from about 0.2 to about 10% by weight, based on the dry weight of the vermiculate in the dispersion, of hydrophobic aliphatic ketene dimer internal sizing agent having the general formula,

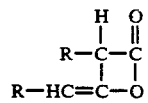

where at least one R is a hydrophobic group containing more than 5 carbon atoms selected from the group consisting of alkyl, alkenyl, aralkyl and aralkenyl groups and the other R is hydrogen or an aliphatic hydrocarbon group.

2. The dispersion of claim 1 wherein aliphatic ketene dimer is incorporated in an amount of from about 0.5 to about 5% by weight, based on the dry weight of the vermiculite in the dispersion.

3. The dispersion of claim 1 wherein the aqueous dispersion of vermiculite lamellae comprises from about 0.1 to about 50% by weight dry vermiculite, and from about 0.5 to about 5% by weight, based on vermiculite, of aliphatic ketene dimer internal sizing agent.

4. A process for the production of articles containing more than 80% by weight of vermiculite comprising the steps of:

(a) incorporating into an aqueous dispersion of vermiculite lamellae from about 0.1 to about 10% by weight, based on the dry weight of the vermiculite in the dispersion, of hydrophobic aliphatic ketene dimer internal sizing agent having the general formula,

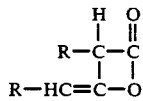

where at least one R is a hydrophobic group containing more than 5 carbon atoms selected from the group consisting of alkyl, alkenyl, aralkyl and aralkenyl groups and the other R is hydrogen or an aliphatic hydrocarbon group; then (b) forming shaped articles from the dispersion produced in step (a) by depositing the aqueous dispersion on a surface and removing water therefrom.

5. The process of claim 4 wherein aliphatic ketene dimer is incorporated in an amount of from about 0.5 to about 5% by weight, based on the dry weight of the vermiculite in the dispersion.

6. The process of claim 4 wherein the aqueous dispersion of vermiculite lamellae comprises from about 0.1 to about 50% by weight dry vermiculite, and from about 0.5 to about 5% by weight, based on vermiculite, of aliphatic ketene dimer internal sizing agent.

7. A shaped article containing more than 80% by weight of vermiculite produced from an aqueous dispersion of vermiculite lamellae having incorporated therein from about 0.2 to about 10% by weight, based on the dry weight of the vermiculite in the dispersion, of hydrophobic aliphatic ketene dimer internal sizing agent having the general formula,

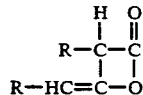

where at least one R is a hydrophobic group containing more than 5 carbon atoms selected from the group consisting of alkyl, alkenyl, aralkyl and aralkenyl groups and the other R is hydrogen or an aliphatic hydrocarbon group.

* * * * *

UNITED STATES PATENT AND TRADEMARK OFFICE
CERTIFICATE OF CORRECTION

PATENT NO. : 5,137,656
DATED : August 11, 1992
INVENTOR(S) : Herbert T. Conner It is certified that error appears in the above-identified patent and that said Letters Patent is hereby corrected as shown below:

Col. 2, line 13, "B.P." should read -- U.K. Specification --;

Col. 9, line 5, "Incorporation" should read -- Incorporated --; and

In the Claims, Col. 9, lines 52 and 53, "vermiculate" should read -- vermiculite --.

Signed and Sealed this

Ninth Day of November, 1993

Attest:

BRUCE LEHMAN

Attesting Officer

Commissioner of Patents and Trademarks